United States Patent
Lee

(10) Patent No.: US 12,045,121 B2
(45) Date of Patent: Jul. 23, 2024

(54) SECURITY IC AND OPERATING METHOD THEREOF

(71) Applicant: SAMSUNG ELECTRONICS CO., LTD., Suwon-si (KR)

(72) Inventor: Jeehyoung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/984,591

(22) Filed: Nov. 10, 2022

(65) Prior Publication Data

US 2023/0153186 A1 May 18, 2023

(30) Foreign Application Priority Data

Nov. 12, 2021 (KR) .................. 10-2021-0156061
May 24, 2022 (KR) .................. 10-2022-0063593

(51) Int. Cl.
*G06F 11/00* (2006.01)
*G06F 11/07* (2006.01)

(52) U.S. Cl.
CPC ...... *G06F 11/0763* (2013.01); *G06F 11/0721* (2013.01)

(58) Field of Classification Search
CPC .. G06F 11/0721; G06F 11/0763; G06F 11/10; G06F 11/1004; G06F 11/1012; G06F 11/1048; G06F 21/64; G06F 21/79
See application file for complete search history.

(56) References Cited

U.S. PATENT DOCUMENTS

| 5,408,476 | A | 4/1995 | Kawai et al. |
| 6,324,669 | B1 | 11/2001 | Westby |
| 8,719,232 | B2 | 5/2014 | Essawi et al. |
| 9,886,362 | B2 | 2/2018 | Van Assche et al. |
| 10,261,714 | B2 | 4/2019 | Kim |
| 10,628,249 | B2 | 4/2020 | Sere et al. |
| 10,810,077 | B1* | 10/2020 | Lui ............ G06F 11/1004 |
| 2010/0077225 | A1* | 3/2010 | Salgado ............ H04L 9/3249 713/189 |
| 2010/0306635 | A1* | 12/2010 | Tang ............ H04L 9/3242 380/278 |
| 2012/0148047 | A1* | 6/2012 | Trimmer ............ G06F 21/79 380/277 |
| 2019/0342101 | A1 | 11/2019 | Hayes et al. |
| 2021/0200631 | A1* | 7/2021 | Palmer ............ G06F 21/64 |
| 2022/0100881 | A1* | 3/2022 | Sato ............ G06F 11/0721 |

* cited by examiner

*Primary Examiner* — Marc Duncan
(74) *Attorney, Agent, or Firm* — Sughrue Mion, PLLC

(57) ABSTRACT

A security integrated circuit (IC) includes a memory including a first register and a second register, a token generation circuit configured to generate first data based on first bits of interest extracted before performance of an operation by using the first register, generate a first token by converting the first data, generate second data based on second bits of interest extracted after the performance of the operation by using the second register, and generate a second token by converting the second data, and an error detection circuit configured to detect an error on the first and second bits of interest by comparing the first token with the second token.

20 Claims, 10 Drawing Sheets

FIG. 4

3-bit Error                                                    410

|             | b0 | b1 | b2 | b3 | b4 | b5 | b6 | b7  | Token(Dec)   |     | Diff. |
|-------------|----|----|----|----|----|----|----|-----|--------------|-----|-------|
|             | 1  | 2  | 4  | 8  | 16 | 32 | 64 | 128 |              |     |       |
| FIRST DATA  | 0  | 0  | 0  | 0  | 1  | 0  | 1  | 1   | FIRST TOKEN  | 208 | 59    |
| SECOND DATA | 1  | 0  | 1  | 0  | 1  | 0  | 0  | 1   | SECOND TOKEN | 149 |       |

4-bit Error                                                    420

|             | b0 | b1 | b2 | b3 | b4 | b5 | b6 | b7  | Token(Dec)   |    | Diff. |
|-------------|----|----|----|----|----|----|----|-----|--------------|----|-------|
|             | 1  | 2  | 4  | 8  | 16 | 32 | 64 | 128 |              |    |       |
| FIRST DATA  | 0  | 1  | 0  | 0  | 1  | 0  | 1  | 0   | FIRST TOKEN  | 82 | 75    |
| SECOND DATA | 1  | 1  | 1  | 0  | 0  | 0  | 0  | 0   | SECOND TOKEN | 7  |       |

5-bit Error                                                    430

|             | b0 | b1 | b2 | b3 | b4 | b5 | b6 | b7  | Token(Dec)   |     | Diff. |
|-------------|----|----|----|----|----|----|----|-----|--------------|-----|-------|
|             | 1  | 2  | 4  | 8  | 16 | 32 | 64 | 128 |              |     |       |
| FIRST DATA  | 0  | 0  | 0  | 0  | 1  | 0  | 1  | 1   | FIRST TOKEN  | 208 | 137   |
| SECOND DATA | 1  | 1  | 1  | 0  | 0  | 0  | 1  | 0   | SECOND TOKEN | 71  |       |

SECURITY IC AND OPERATING METHOD THEREOF

CROSS-REFERENCE TO RELATED APPLICATIONS

This application is based on and claims priority under 35 U.S.C. § 119 to Korean Patent Application Nos. 10-2021-0156061, filed on Nov. 12, 2021, and 10-2022-0063593, filed on May 24, 2022, in the Korean Intellectual Property Office, the disclosures of which are incorporated by reference herein in their entireties.

BACKGROUND

1. Field

The disclosure relates to a security integrated circuit (IC) and an operating method thereof, and more particularly, to a security IC for detecting error bits in a register and an operating method thereof.

2. Description of Related Art

Recently, along with the rapid development of wired and wireless communication technologies and smart device-related technologies, the necessity of security system establishment has also been increasing to safely use a device in an embedded system environment.

In particular, for security integrated circuits (ICs), data integrity needs to be guaranteed to prevent significant data from being modified in during an operation performed by an electronic device in response to a fault attack launched from an external device. To this end, recent security ICs use an XOR scheme, a parity scheme, a dual flip-flop scheme, or the like to detect error bits resulting from data modification.

However, the XOR and parity schemes cannot detect a multi-bit error of more than one bit, and the dual flip-flop scheme causes an excessive overhead to a memory, and thus, the XOR, parity, and dual flip-flop schemes have restrictions to be used as a data error detection scheme in an embedded system based on a lightweight memory. Therefore, a security IC for guaranteeing data integrity in an embedded system is required.

SUMMARY

The disclosure provides a security integrated circuit (IC) for guaranteeing data integrity by detecting error bits in a register.

The disclosure also provides an operating method of a security IC for guaranteeing data integrity by detecting error bits in a register.

The technical problems of the disclosure are not limited to the technical problems described above, and other technical problems not described above could be clearly understood to those of ordinary skill in the art from the description below.

According to an aspect of the disclosure, there is provided a security integrated circuit (IC) including: a memory including a first register and a second register; a token generation circuit configured to: generate first data based on first bits of interest extracted before performance of an operation from the first register, generate a first token by converting the first data, generate second data based on second bits of interest extracted after the performance of the operation from the second register, and generate a second token by converting the second data; and an error detection circuit configured to detect an error on the first bits of interest or the second bits of interest by comparing the first token with the second token.

The error detection circuit may be further configured to determine that no error has occurred on the first bits of interest or the second bits of interest based on a difference value between the first token and the second token being zero as a result of the comparing.

The error detection circuit may be further configured to determine that an error has occurred on the first bits of interest or the second bits of interest based on a difference value between the first token and the second token being not zero as a result of the comparing.

The error detection circuit may be further configured to identify a number of at least one error-occurred bit or a location of the at least one error-occurred bit based on a result of the comparing between the first token and the second token.

The error detection circuit may be further configured to: increase an error counter value by 1 based on a difference value between the first token and the second token being not zero as a result of the comparing, and transmit a signal including an operation stop command or a reset command to the processor based on the error counter value being greater than a reference value.

The token generation circuit may be further configured to generate the first token and the second token by performing one of a hash operation, a modular operation, a multiplication operation, an addition operation, a division operation, an XOR operation, and a data conversion operation according to a particular notation, on the first data and the second data, respectively.

The first bits of interest may indicate bit values stored at first locations in a register before the performance of the operation, and the second bits of interest may indicate bit values stored at the first locations of the first bits of interest in the register after the performance of the operation.

According to another aspect of the disclosure, there is provided an operating method of a security integrated circuit (IC), the method including: generating first data based on first bits of interest extracted before performance of an operation; generating a first token by converting the first data; generating second data based on second bits of interest extracted after the performance of the operation; generating a second token by converting the second data; and detecting an error on the first bits of interest or the second bits of interest by comparing the first token with the second token.

The detecting the error may be comprised of determining that no error has occurred on the first bits of interest or the second bits of interest based on a difference value between the first token and the second token being zero as a result of the comparing.

The detecting the error may be comprised of determining that an error has occurred on the first bits of interest or the second bits of interest based on a comparison difference value between the first token and the second token being not zero as a result of the comparing.

The operating method of a security integrated circuit (IC) may be further comprised of identifying a number of at least one error-occurred bit or a location of the at least one error-occurred bit based on a result of the comparing between the first token and the second token.

The operating method of a security integrated circuit (IC) may be further comprised of increasing an error counter value by 1 based on a difference value between the first token and the second token being not zero as a result of the comparing; and transmitting a signal comprising an operation stop command or a reset command to a processor based on the error counter value being greater than a reference value.

The generating the first token and the generating the second token may be comprised of generating the first token and the second token by performing one of a hash operation, a modular operation, a multiplication operation, an addition operation, a division operation, and an XOR operation on the first data and the second data, respectively.

The first bits of interest indicate bit values stored at first locations in a register before the performance of the operation, and the second bits of interest indicate bit values stored at the first locations of the first bits of interest in the register after the performance of the operation.

According to another aspect of the disclosure, there is provided an electronic device including: a memory including at least one register; and a processor configured to: generate first data based on first bits of interest extracted before performance of an operation by the electronic device, generate a first token by converting the first data, generate second data based on second bits of interest extracted after the performance of the operation by the electronic device, generate a second token by converting the second data, and identify a number of error-occurred bits or locations of the error-occurred bits based on a result of a comparison between the first token and the second token.

The processor may be further configured to determine that an error has occurred on at least one bit among the first bits of interest or the second bits of interest based on a comparison difference value between the first token and the second token being not zero as a result of the comparing.

The processor may be further configured to: increase an error counter value by 1 based on a difference value between the first token and the second token being not zero as a result of the comparing, and transmit a signal comprising an operation stop command or a reset command to the processor based on the error counter value is greater than a reference value.

The processor may be further configured to generate the first token and the second token by performing one of a hash operation, a modular operation, a multiplication operation, an addition operation, a division operation, an XOR operation, and a data conversion operation according to a particular notation, on the first data and the second data, respectively.

The first bits of interest may indicate bit values stored at particular locations in the at least one register before the performance of the operation, and the second bits of interest may indicate bit values stored at the locations of the first bits of interest in the at least one register after the performance of the operation.

BRIEF DESCRIPTION OF DRAWINGS

Embodiments of the disclosure will be more clearly understood from the following detailed description taken in conjunction with the accompanying drawings in which:

FIG. 4 illustrates an example of detecting error bits based on a comparison result between tokens, according to an example embodiment;

DETAILED DESCRIPTION OF EMBODIMENTS

Hereinafter, embodiments of the disclosure are described in detail with reference to the accompanying drawings. As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
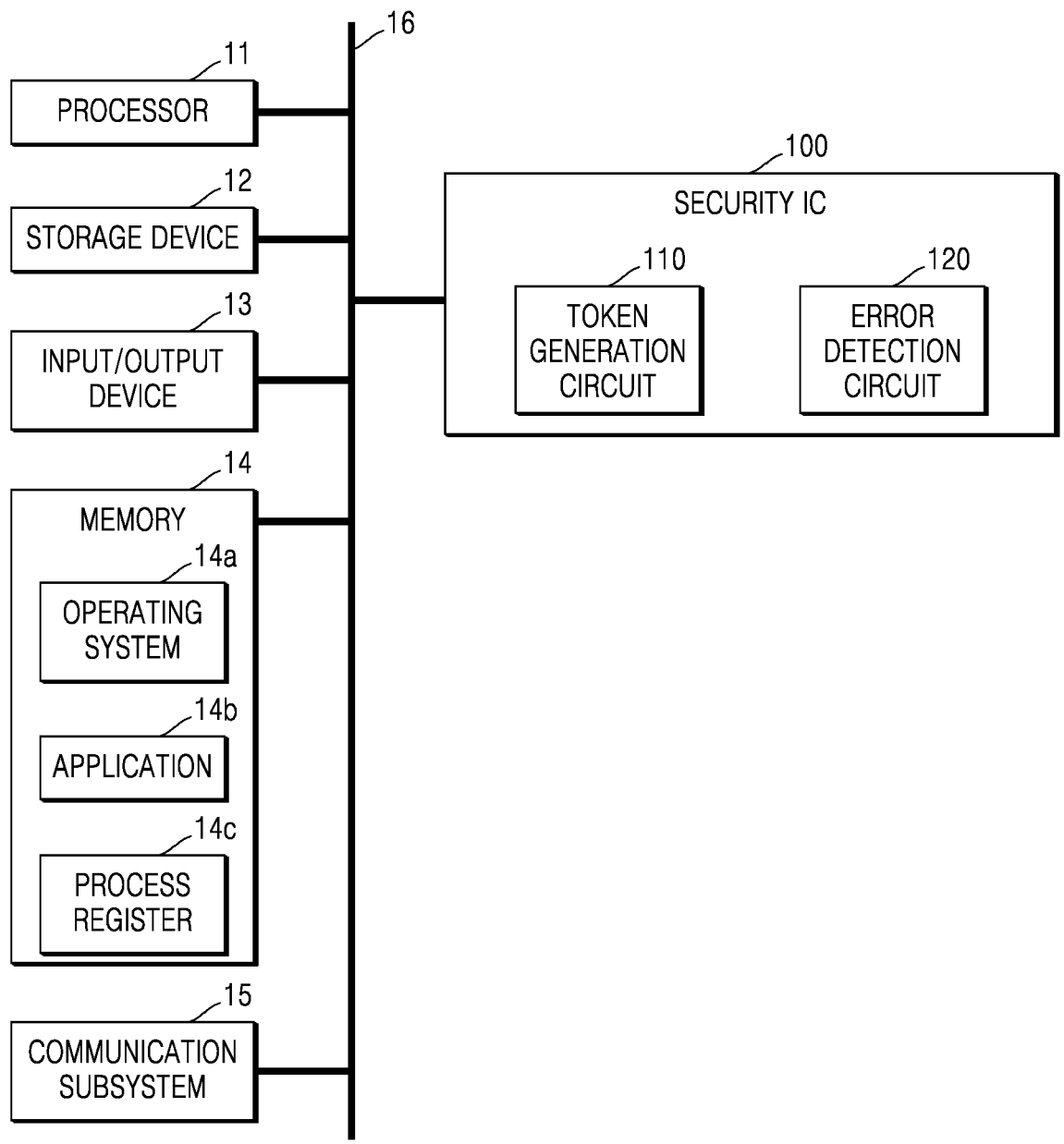
FIG. 1 is a block diagram schematically illustrating an apparatus according to an example embodiment.

FIG. 1 is a block diagram schematically illustrating an apparatus 10 according to an example embodiment.

Referring to FIG. 1, the apparatus 10 may include a processor 11, a storage device 12, an input/output device 13, a memory 14, a communication subsystem 15, a bus 16, and a security integrated circuit (IC) 100. The apparatus 10 may include hardware elements, which may be electrically coupled (or communicate with each other) via the bus 16. That is, the processor 11 may include hardware elements, and the hardware elements may include one or more general-purpose processors and/or one or more special-purpose processors (e.g., digital signal processing chips, graphics acceleration processors, and the like). The input/output device 13 may input/output data to be processed or data processed by the processor 11. According to an example embodiment, the input/output device 13 may include circuitry to perform an input operation and an output operation.

The storage device 12 may include a local and/or network accessible storage without limitation. For example, the storage device 12 may include a disk drive, a drive array, an optical storage device, a solid state storage device, and the like. The storage device 12 may be programmable or flash-updatable, and be implemented to apply various file systems, a database structure, and the like thereto.

The communication subsystem 15 may include a modem, a (wireless or wired) network card, an infrared communication device, a wireless communication device, chipsets (e.g., a Bluetooth device, an 802.11 device, a Wi-Fi device, a WiMax device, a cellular communication device, and the like), and/or the like without limitation. The communication subsystem 15 may allow electronic signature-related data generated according to an example embodiment to be exchanged with (or transmitted to) a network, other computer systems/devices, and/or other random devices.

The memory 14 may include an operating system 14a, an application 14b, and/or a register 14c, the application 14b having device drivers, executable libraries, and/or program code. The operating system 14a and the application 14b are software elements and may be implemented by executing code and/or commands by a computer (or a processor in the computer). The register 14c may store data (e.g., instructions, control data, input/output data, and the like) related to at least one operation or at least one process performed by the apparatus 10.

While performing an operation by an apparatus 10, a fault attack to the apparatus 10 or the memory 14 in the apparatus 10 may be launched from the outside. For example, the fault attack to the apparatus 10 or the memory 14 in the apparatus 10 may be launched from an external device. The fault attack may indicate an attack method of damaging or modifying information related to an operation performed by the apparatus 10 by processing or modifying physical information (e.g., a sound, power, an operation time, or the like) generated during the operation performed by the apparatus 10.

The security IC 100 according to an example embodiment is a security device for guaranteeing data integrity and may include a token generation circuit 110 configured to generate a token, and an error detection circuit 120 configured to detect an error included in data.

The token generation circuit 110 according to an example embodiment may generate tokens for bits of interest based on a data operation. For example, the data operation may include at least one of a hash operation, a modular operation, a multiplication operation, an addition operation, a division operation, an XOR operation, and a conversion operation based on a particular notation.

The error detection circuit 120 according to an example embodiment may determine whether error bits have been generated during an operation performed by the apparatus 10 (i.e., performance of an operation by the apparatus 10), based on a comparison result between generated tokens. According to an example embodiment, the operation performed by the apparatus or the performance of the operation may include processing data corresponding to the operation. For example, if token values do not match each other according to comparison between tokens, the error detection circuit 120 may determine that error bits have been generated during performance of the operation. In this case, the error detection circuit 120 may increase an error counter value based on the generation of error bits during the performance of the operation. According to an example embodiment, the error detection circuit 120 may increase an error counter value in response to the generation of error bits during the data processing. When the error counter value is greater than a threshold, the error detection circuit 120 may transmit a signal including a stop command to stop performing the operation or a reset command to the processor 11. According to an example embodiment, the threshold may be a reference value.

In an example embodiment, the security IC 100 may be implemented by a hardware logic or include a logic block designed by logic synthesis. In addition, the security IC 100 may include a software block implemented by executing, by the security IC 100, a code set and/or commands stored in a non-transitory computer-readable storage medium, such as the storage device 12. In some example embodiments, the storage medium may be provided as a device (e.g., a detachable medium, such as a compact disk or a universal serial bus (USB)) separated from a computer device or an installation package so as to be usable to program or adapt a general-purpose computer in which a code set and/or commands are stored. Such code set and/or commands may have an executable code form executable by the security IC 100 and have a source form having executable code and/or an executable code form when compiled and/or installed in the security IC 100.

According to example embodiments, the security IC 100 may be referred to as a security processor, and furthermore, the security IC 100 may be integrated with the processor 11 to form a single block.

Figure 2A:
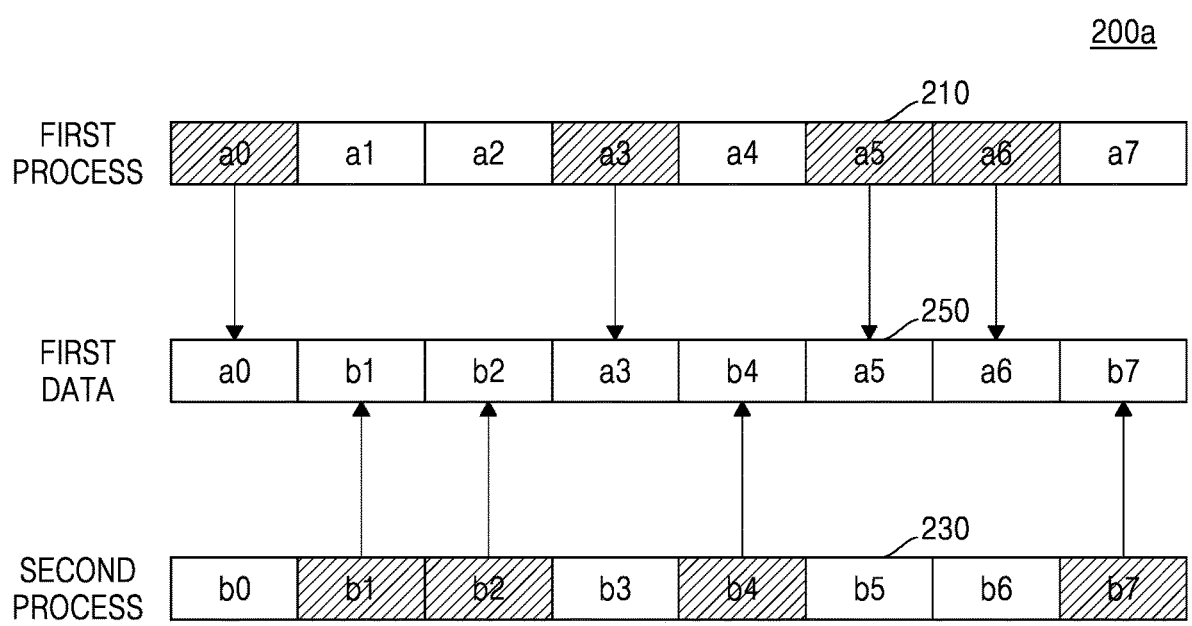
FIGS. 2A and 2B illustrate processes of generating data for error detection based on bits of interest, according to an example embodiment.
Figure 2B:
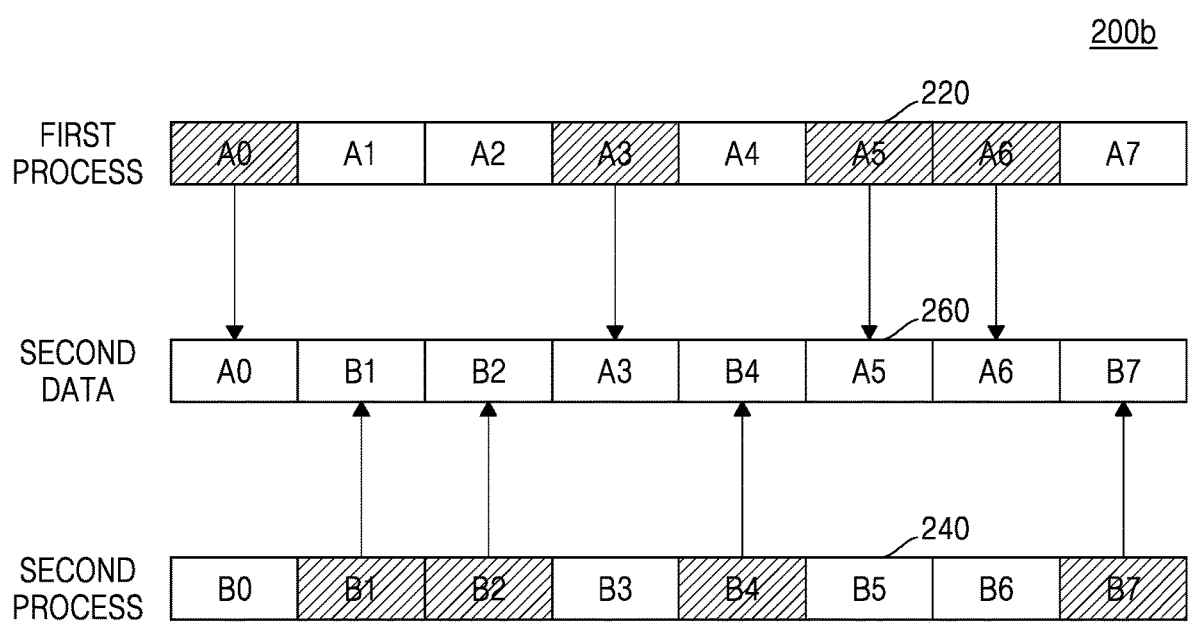

FIGS. 2A and 2B illustrate processes 200a and 200b of generating data for error detection based on bits of interest, according to an example embodiment.

According to an example embodiment, FIGS. 2A and 2B illustrate the processes 200a and 200b for describing the token generation circuit 110 in the security IC 100 of FIG. 1, which is configured to generate data, from which an error is to be detected, based on bits of interest. In the example embodiment, a description is made based on a first operation and a second operation, but the disclosure is not limited thereto, and as such, according to another example embodiment, the number of operations, the number of bits of interest, and the number of pieces of data, from which an error is to be detected, may be variously changed according to example embodiments. Hereinafter, FIGS. 2A and 2B are described with reference to FIG. 1.

Referring to FIG. 2A, the token generation circuit 110 may extract bits of interest from data stored in the register 14c before performance of an operation and generate first data 250, from which an error is to be detected, based on the extracted bits of interest.

According to an example embodiment, in the register 14c, bit values a0 to a7 are stored as first operation-related data 210, and bit values b0 to b7 are stored as second operation-related data 230. In this case, bits of interest may indicate operation-related data or bit values required to check whether error bits have been generated, according to a request of a system or a user.

The token generation circuit 110 may extract a0, a3, a5, and a6 as bits of interest from the first operation-related data 210 stored in the register 14c, before processing the data of a first operation. In addition, the token generation circuit 110 may extract b1, b2, b4, and b7 as bits of interest from the second operation-related data 230 stored in the register 14c, before processing the data of a second operation.

The token generation circuit 110 may generate the first data 250, from which an error is to be detected, based on the bit values a0, a3, a5, a6, b1, b2, b4, and b7 of the extracted bits of interest.

Referring to FIG. 2B, the token generation circuit 110 may extract bits of interest from data stored in the register 14c after performance of the operation and generate second data 260, from which an error is to be detected, based on the extracted bits of interest.

In this case, according to an example embodiment, in the register 14c, bit values A0 to A7 are stored as first operation-related data 220 after processing the first operation, and bit values B0 to B7 are stored as second operation-related data 240 after processing the second process. In this case, bits of interest may indicate operation-related data or bit values required to check whether error bits have been generated, according to a request of the system or the user.

The token generation circuit 110 may extract A0, A3, A5, and A6 as bits of interest from the first operation-related data 220 stored in the register 14, after processing the first operation. In addition, the token generation circuit 110 may extract B1, B2, B4, and B7 as bits of interest from the second operation-related data 240 stored in the register 14c, after processing the second process.

The token generation circuit 110 may generate the second data 260, from which an error is to be detected, based on the bit values A0, A3, A5, A6, B1, B2, B4, and B7 of the extracted bits of interest.

Figure 3:
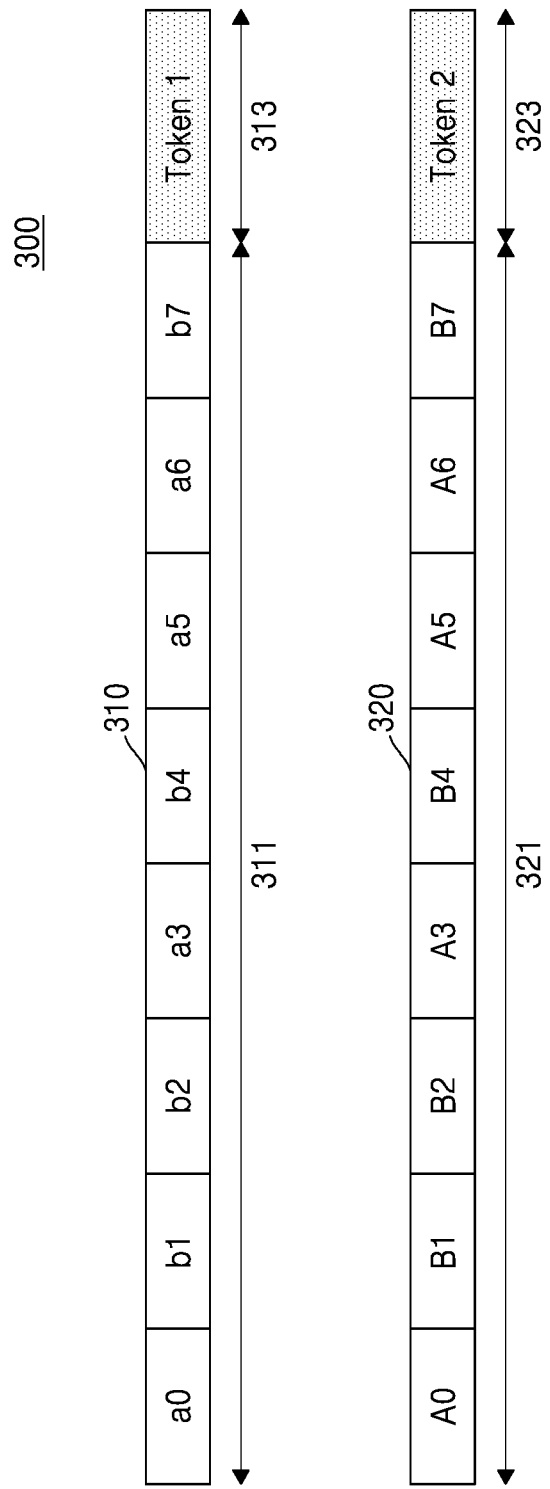
FIG. 3 illustrates a process of generating a data-specific token, according to an example embodiment.

FIG. 3 illustrates a process 300 of generating a data-specific token, according to an example embodiment.

For example, FIG. 3 illustrates the process 300 for describing the token generation circuit 110 in the security IC 100 of FIG. 1, which is configured to generate a token based on data, from which an error is to be detected. In the example embodiment, a description is made based on the first operation and the second operation, but the example embodiment is not limited thereto, and the number of processes, the number of bits of interest, and the number of pieces of data, from which an error is to be detected, may be variously changed according to example embodiments. Hereinafter, FIG. 3 is described with reference to FIGS. 1, 2A, and 2B.

Referring to FIG. 3, the token generation circuit 110 may perform an operation for generating a token based on data, from which an error is to be detected, including extracted bits of interest. The operation for generating a token may indicate any one of a hash operation, a modular operation, a multiplication operation, an addition operation, a division operation, an XOR operation, and a data conversion operation according to a particular notation (e.g., a data conversion operation according to the decimal system). For example, the token generation circuit 110 may generate a token '208' by applying a decimal conversion operation to 8-bit data (binary) '00001011' that is data, from which an error is to be detected.

In this case, according to an example embodiment, in the memory 14, first data 311 as data, from which an error is to be detected, before processing the first operation and the second operation includes a0, a3, a5, a6, b1, b2, b4, and b7, and second data 321 as data, from which an error is to be detected, after processing the first operation and the second operation includes A0, A3, A5, A6, B1, B2, B4, and B7.

According to an example embodiment, the token generation circuit 110 may generate a first token 313 by applying to the first data, any one of a hash operation, a modular operation, a multiplication operation, an addition operation, a division operation, an XOR operation, and a data conversion operation according to a particular notation. Moreover, the token generation circuit 110 may generate a second token 323 by applying to the second data, any one of a hash operation, a modular operation, a multiplication operation, an addition operation, a division operation, an XOR operation, and a data conversion operation according to a particular notation.

According to an example embodiment, the token generation circuit 110 may generate a third data 310 by mapping the first data 311 and the first token 313. According to an example embodiment, the token generation circuit 110 may generate a third data 310 by associating the first data 311 with the first token 313. According to an example embodiment, the token generation circuit 110 may generate a fourth data 320 by mapping the second data 321 and the second token 323. According to an example embodiment, the token generation circuit 110 may generate a fourth data 320 by associating the second data 321 with the second token 323. According to an example embodiment, the token generation circuit 110 may store the third data 310 and fourth data 320 in the memory 14 to use the third data 310 and the fourth data 320 for error bit detection.

FIG. 4 illustrates an example 400 of detecting error bits based on a comparison result between tokens, according to an example embodiment.

According to an example embodiment, FIG. 4 provides an illustration 400 for describing the error detection circuit 120 in the security IC 100 of FIG. 1, which detects error bits by comparing generated tokens. In the example embodiment, a description is made based on a token generated according to decimal data conversion, but the example embodiment is not limited thereto, and the token may be generated by various operations. Hereinafter, FIG. 4 is described with reference to FIGS. 1, 2A, 2B and 3.

Referring to FIG. 4, the error detection circuit 120 may detect error bits generated during performance of the operation by comparing generated tokens based on bits of interest.

The error detection circuit 120 may detect multi-bit errors (e.g., a 3-bit error 410, a 4-bit error 420, or a 5-bit error 430) by comparing first data before processing a process to second data after processing the process. The error detection circuit 120 may identify the number of error-occurred bits and/or locations of the error-occurred bits by analyzing a comparison result between tokens. In this case, it is assumed that each of the first data that is data, from which an error is to be detected, before processing the process and the second data that is data, from which an error is to be detected, after processing the process is 8-bit data converted into the binary system, and a used token generation operation is a data conversion operation according to the decimal system.

According to an example embodiment, for the 3-bit error 410, the error detection circuit 120 may generate a first token '208' and a second token '149' by applying the token generation operation to first data '00001011' and second data '10101001', respectively. The error detection circuit 120 may identify the occurrence of the 3-bit error 410 at locations of b0, b2, and b6 in a data structure during performance of the operation, based on a comparison result (a comparison difference value '59') between the first token '208' and the second token '149'.

According to an example embodiment, for the 4-bit error 420, the error detection circuit 120 may generate a first token '82' and a second token '7' by applying the token generation operation to first data '01001010' and second data '11100000', respectively. The error detection circuit 120 may identify the occurrence of the 4-bit error 420 at locations of b0, b2, b4, and b6 in a data structure during performance of the operation, based on a comparison result (a comparison difference value '75') between the first token '82' and the second token '7'.

According to an example embodiment, for the 5-bit error 430, the error detection circuit 120 may generate a first token '208' and a second token '71' by applying the token generation operation to first data '00001011' and second data '11100010', respectively. The error detection circuit 120 may identify the occurrence of the 5-bit error 430 at locations of b0, b1, b2, b4, and b7 in a data structure during performance of the operation, based on a comparison result (a comparison difference value '137') between the first token '208' and the second token '71'.

The error detection circuit 120 may detect error bits by using a comparison result between tokens based on bits of interest, thereby detecting a multi-bit error by using a lightweight circuit in an embedded system. Therefore, a security system of which data integrity is guaranteed may be provided through a security IC according to an example embodiment.

Figure 5:
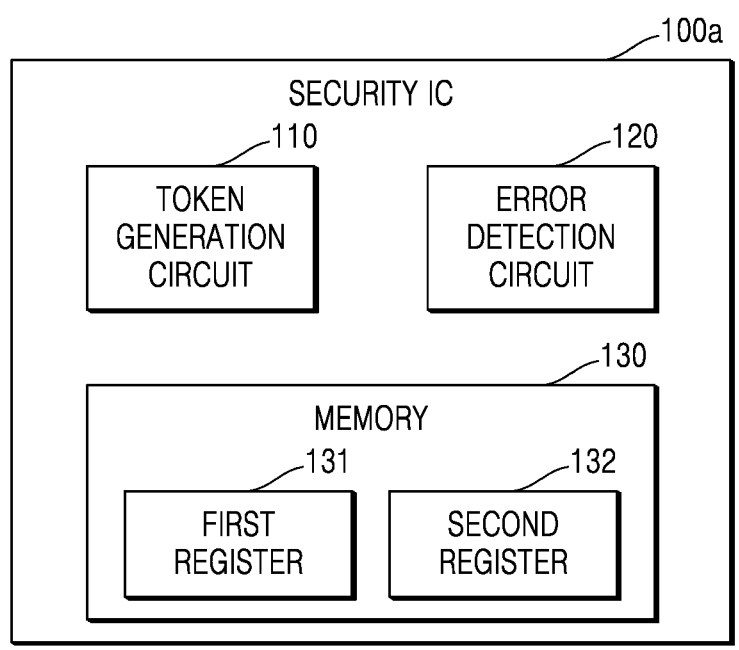
FIG. 5 is a block diagram illustrating a security integrated circuit (IC) according to an example embodiment.

FIG. 5 is a block diagram illustrating a security IC 100a according to an example embodiment. The security IC 100a of FIG. 5 may be an example of the security IC 100 of FIG. 1. Hereinafter, FIG. 5 is described with reference to FIGS. 1 to 4.

Referring to FIG. 5, the security IC 100a may include the token generation circuit 110, the error detection circuit 120, and a memory 130.

The token generation circuit 110 may generate data, from which an error is to be detected, by extracting bits of interest among operation-related data stored in an apparatus. The bits of interest may indicate operation-related data or bit values, as bits required to check whether error bits have been generated, according to a request of the system or the user. For example, the token generation circuit 110 may generate first data based on bits of interest extracted before performance of the operation and generate second data based on bits of interest extracted after the performance of the operation.

The token generation circuit 110 may generate a token by performing an operation on data, from which an error is to be detected. For example, the token generation circuit 110 may generate a first token by performing on the first data and the second data, any one of a hash operation, a modular operation, a multiplication operation, an addition operation, a division operation, an XOR operation, and a data conversion operation according to a particular notation and may generate a second token by performing on second data, any one of a hash operation, a modular operation, a multiplication operation, an addition operation, a division operation, an XOR operation, and a data conversion operation according to a particular notation.

The error detection circuit 120 may detect error bits generated during performance of the operation based on a comparison result between generated tokens. For example, if a comparison difference value between the first token and the second token is not zero, the error detection circuit 120 may determine that error bits have been generated, and increase an error counter value. If the comparison difference value between the first token and the second token is zero, the error detection circuit 120 may determine that no error bits have been generated during the performance of the operation.

The error detection circuit 120 may identify the number of error-occurred bits and/or locations of the error-occurred bits based on a comparison result between generated tokens.

If the error counter value is greater than a threshold according to the generation of error bits, the error detection circuit 120 may transmit a signal including a stop command to stop the operation or a reset command to the processor 11. If the error counter value is less than or equal to the threshold, the error detection circuit 120 may increase the error counter value by 1 and initialize a first register 131 and a second register 132. According to an example embodiment, if the error counter value is greater than a reference value according to the generation of error bits, the error detection circuit 120 may transmit a signal including a stop command to stop the operation or a reset command to the processor 11. If the error counter value is less than or equal to the reference value, the error detection circuit 120 may increase the error counter value by 1 and initialize a first register 131 and a second register 132.

The memory 130 includes the first register 131 and the second register 132.

The first register 131 may store data, from which an error is to be detected, generated based on first bits of interest extracted before performance of the operation. The second register 132 may store data, from which an error is to be detected, generated based on second bits of interest extracted after the performance of the operation. The first bits of interest stored in the first register 131 indicate bit values stored at particular locations of the register 14c before the performance of the operation, and the second bits of interest stored in the second register 132 indicate bit values stored at the locations of the first bits of interest in the register 14c after the performance of the operation.

The security IC 100 or 100a according to the disclosure may perform an error detection operation using a token, which is described below with reference to FIGS. 6 to 8, thereby having the characteristics of enabling selective error detection for multi-bit errors and guaranteeing data integrity without generating an excessive overhead to a memory. Accordingly, a security system or a security IC suitable for an embedded system may be provided. Hereinafter, an error detection operation using a token is described in detail.

Figure 6:
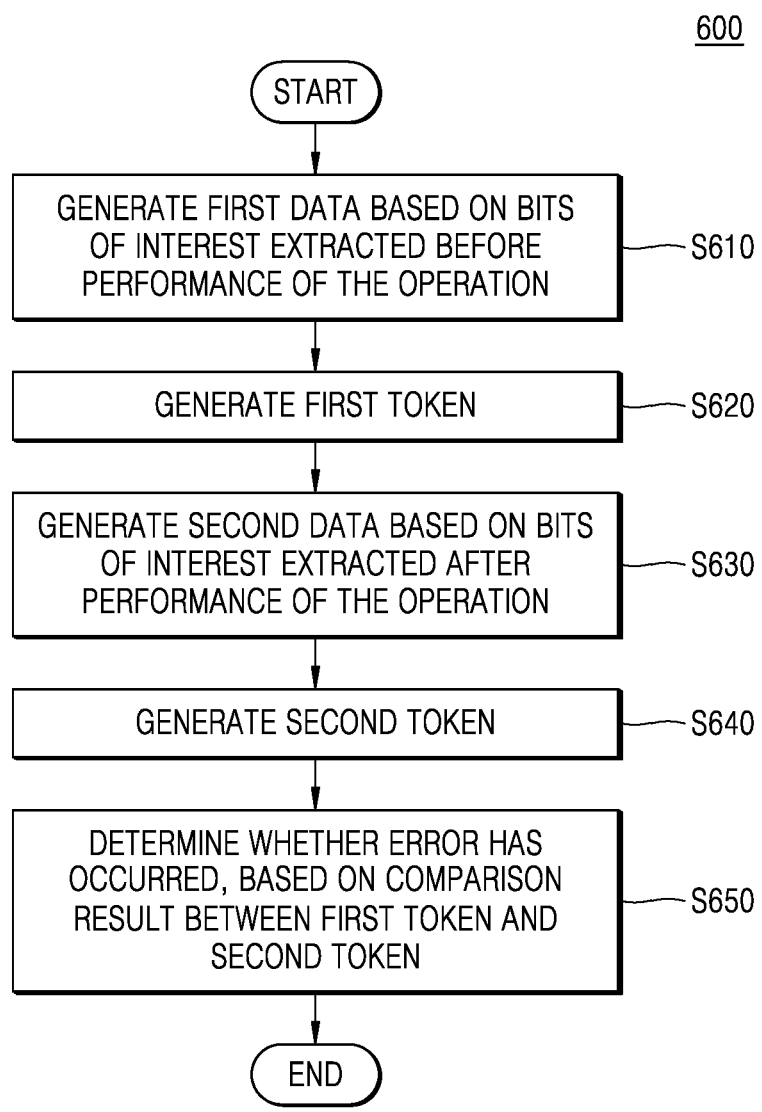
FIG. 6 is a flowchart illustrating an operating method of a security IC, according to an example embodiment.

FIG. 6 is a flowchart illustrating an operating method 600 of a security IC, according to an example embodiment. For example, FIG. 6 is a flowchart for describing a token generation error detection operation performed by the token generation circuit 110 and the error detection circuit 120 in the security IC 100 of FIG. 1. Hereinafter, FIG. 6 is described with reference to FIGS. 1 to 5.

Referring to FIG. 6, the token generation and error detection operation may include operations S610, S620, S630, S630, and S650.

In operation S610, the token generation circuit 110 may generate first data based on bits of interest extracted before performance of the operation. For example, the token generation circuit 110 may generate the first data that is data, from which an error is to be detected, by extracting first bits of interest among data related to at least one operation before performing the at least one operation. The first bits of interest are bit values stored at particular locations in the register 14c before performance of the operation and may indicate bits required to check whether error bits have been generated. As illustrated according to an example embodiment in FIGS. 2A, the at least one operation may include a first operation and a second operation, and as such, the token generation circuit 110 may generate the first data that is data, from which an error is to be detected, by extracting first bits of interest among data related to the first operation before performing the first operation and by extracting second bits of interest among data related to the second operation before performing the second operation.

In operation S620, the token generation circuit 110 may generate a first token. For example, the token generation circuit 110 may generate the first token by performing, on the first data, any one of a hash operation, a modular operation, a multiplication operation, an addition operation, a division operation, an XOR operation, and a data conversion operation according to a particular notation.

In operation S630, the token generation circuit 110 may generate second data based on bits of interest extracted again after the performance of the operation. For example, the token generation circuit 110 may generate the second data that is data, from which an error is to be detected, by extracting second bits of interest among data related to the at least one operation after performing the at least one operation. The second bits of interest may indicate bit values stored at the locations of the first bits of interest in the register 14c after processing the at least one process. As illustrated according to an example embodiment in FIGS. 2B, the at least one operation may include the first operation and the second operation, and as such, the token generation circuit 110 may generate the second data, that is data, from which an error is to be detected, by extracting first bits of interest among data related to the first operation after performing the first operation and by extracting second bits of interest among data related to the second operation after performing the second operation.

In operation S640, the token generation circuit 110 may generate a second token. For example, the token generation circuit 110 may generate the second token by applying the same operation as in operation S620 to the second data.

In operation S650, the error detection circuit 120 may determine whether an error has occurred, based on a comparison result between the first token and the second token. For example, the error detection circuit 120 may detect error bits generated while processing the at least one process, based on a comparison result between generated tokens.

The error detection circuit 120 may identify the number of error-occurred bits and/or locations of the error-occurred bits based on the comparison result between the generated tokens. The error detection operation is described below in detail with reference to FIG. 7.

Figure 7:
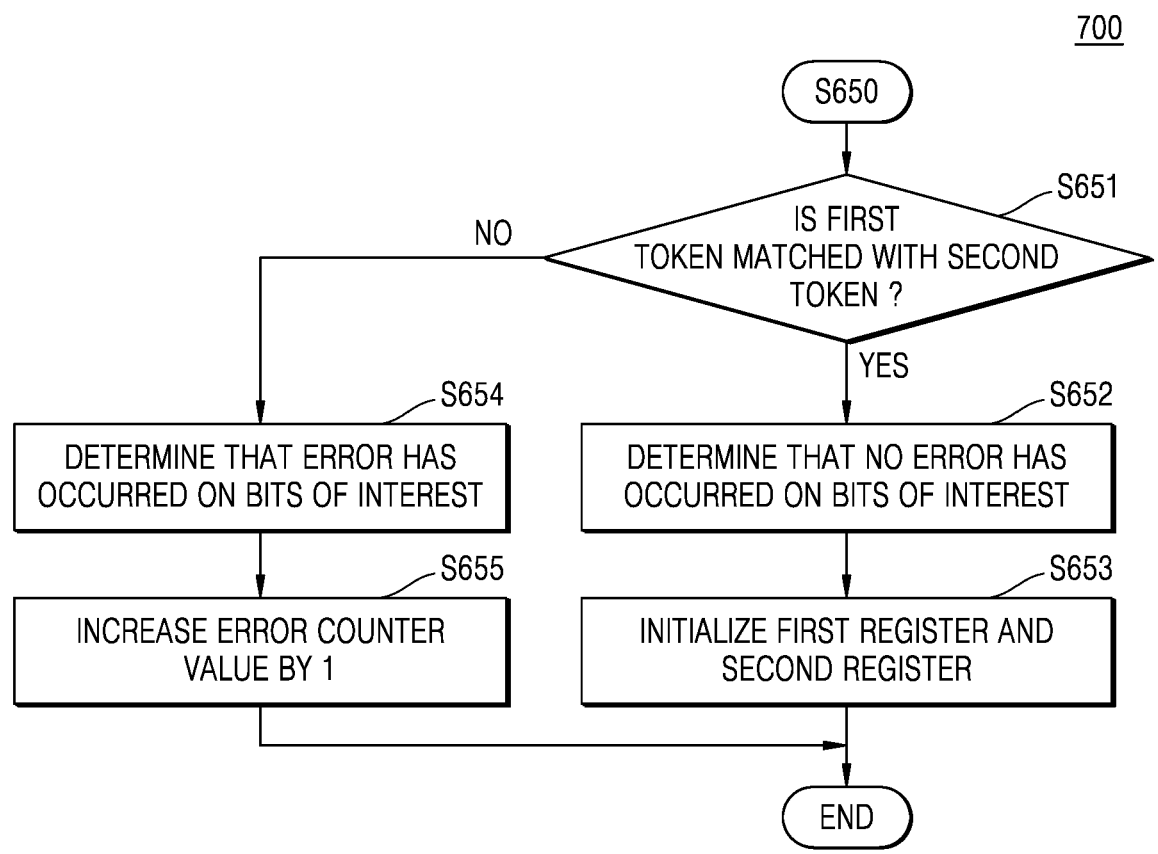
FIG. 7 is a flowchart illustrating an error detection operation of the security IC, according to an example embodiment.

FIG. 7 is a flowchart illustrating an error detection operation 700 of the security IC, according to an example embodiment. For example, FIG. 7 is a flowchart for describing the error detection operation using tokens, which is performed by the error detection circuit 120 in the security IC 100 of FIG. 1. Hereinafter, FIG. 7 is described with reference to FIGS. 1 to 6.

Referring to FIG. 7, the error detection operation using tokens may include operations S651, S652, S653, S654, and S655.

In operation S651, the error detection circuit 120 may identify whether the first token is matched with the second token. For example, the error detection circuit 120 may identify whether error bits have been generated in a process of processing at least one process, by identifying whether the first token before processing the at least one process is matched with the second token after processing the at least one process. If the first token is matched with the second token, the error detection circuit 120 may perform operation S652. If the first token is not matched with the second token, the error detection circuit 120 may perform operation S654.

In operation S652, the error detection circuit 120 may determine that no error has occurred on bits of interest. For example, if a comparison difference value between the first token and the second token is zero, the error detection circuit 120 may determine that no error bits have been generated while processing the at least one process.

In operation 653, the error detection circuit 120 may initialize the first register 131 and the second register 132. For example, the error detection circuit 120 may initialize the first register 131 and the second register 132 by determining that no error bits have been generated while processing the at least one process.

In operation S654, the error detection circuit 120 may determine that an error has occurred on the bits of interest. For example, if the comparison difference value between the first token and the second token is not zero, the error detection circuit 120 may determine that error bits have been generated while processing the at least one process.

In operation S655, the error detection circuit 120 may increase an error counter value by 1. For example, the error detection circuit 120 may transmit error detection feedback to the processor 11 by using the error counter value related to the at least one process, thereby preventing the at least one process from being abnormally processed due to the error-occurred bits. An error detection feedback operation after the error detection is described below in detail with reference to FIG. 8.

Figure 8:
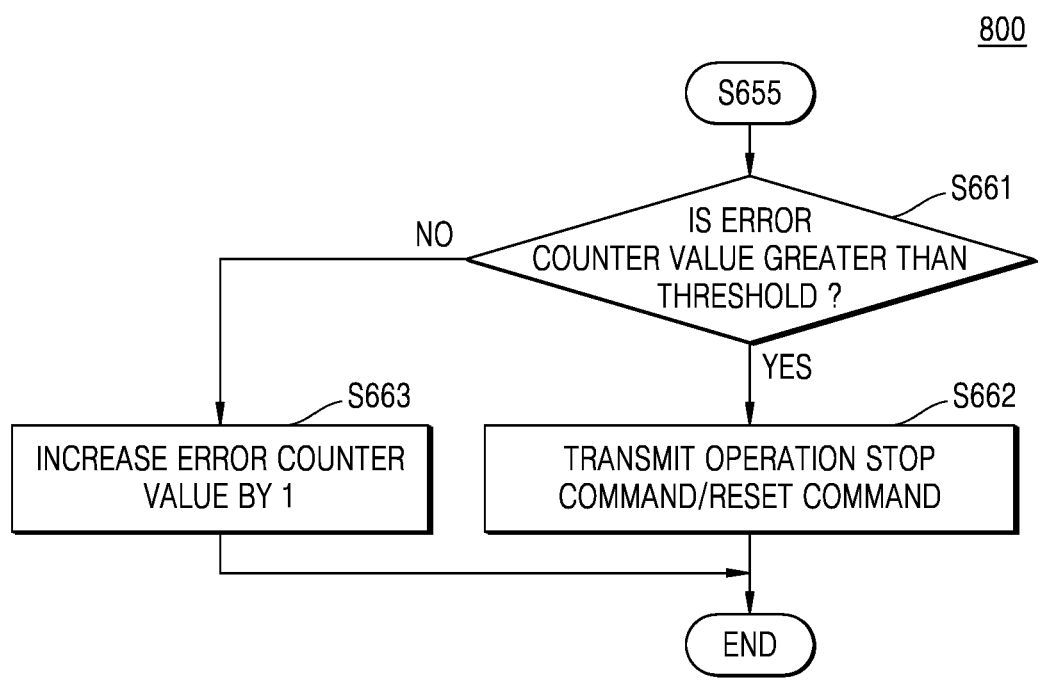
FIG. 8 is a flowchart illustrating a system control operation of the security IC in response to error detection, according to an example embodiment.

FIG. 8 is a flowchart illustrating a system control operation 800 of the security IC based on error detection, according to an example embodiment. For example, FIG. 8 is a flowchart for describing an error detection feedback operation performed by the error detection circuit 120 in the security IC 100 of FIG. 1. Hereinafter, FIG. 8 is described with reference to FIGS. 1 to 7.

Referring to FIG. 8, the error detection feedback operation may include operations S661, S662, and S663.

In operation S661, the error detection circuit 120 may identify whether the error counter value is greater than a threshold. For example, the error detection circuit 120 may identify whether the error counter value related to the at least one process is greater than the threshold, to transmit error detection feedback for the at least one process.

If the error counter value is greater than the threshold, the error detection circuit 120 may perform operation S662. If the error counter value is less than or equal to the threshold, the error detection circuit 120 may perform operation S663.

In operation S662, the error detection circuit 120 may transmit a signal including an operation stop command/a reset command. For example, the error detection circuit 120 may transmit the signal including an operation stop command/a reset command to the processor 11 to prevent the at least one process from being abnormally processed.

In operation S663, the error detection circuit 120 may increase the error counter value by 1. For example, if the error counter value is less than or equal to the threshold, the error detection circuit 120 may increase the error counter value by 1 and initialize the first register 131 and the second register 132.

Figure 9:
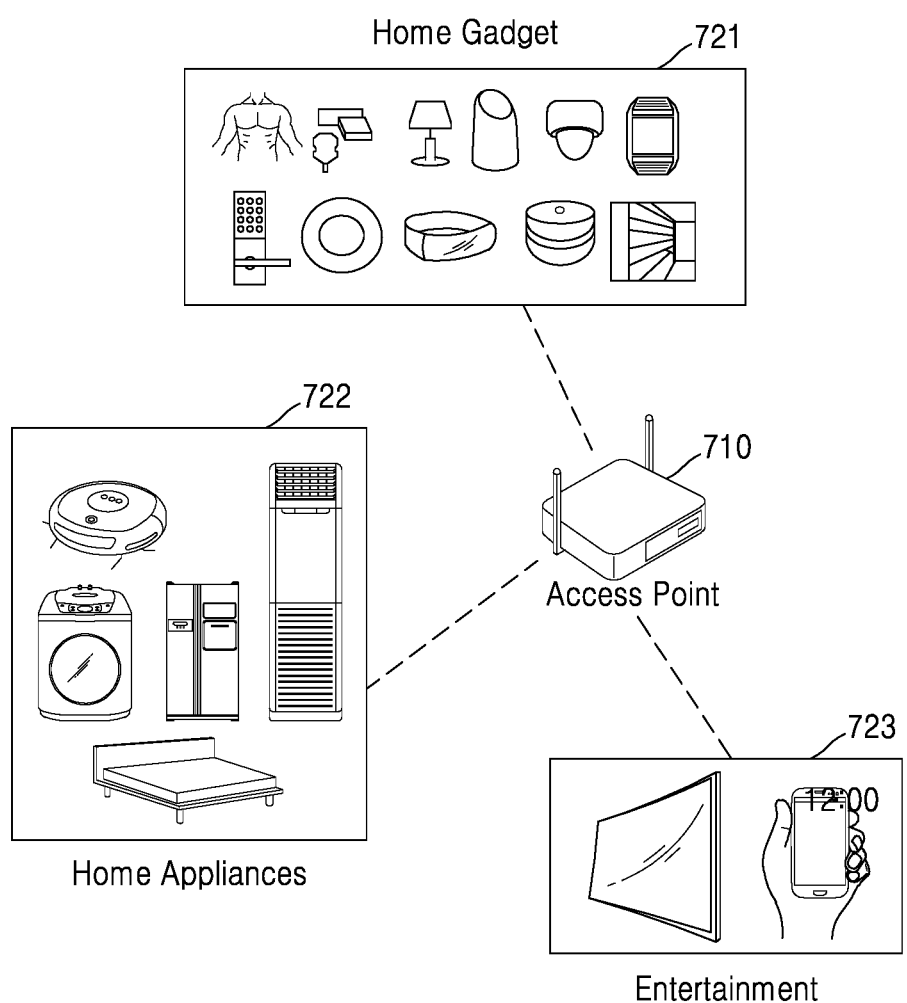
FIG. 9 illustrates communication devices for performing security verification through an electronic signature generated according to an example embodiment.

FIG. 9 illustrates communication devices for performing security verification through an electronic signature generated according to an example embodiment.

For example, FIG. 9 illustrates an example in which various communication devices communicate with each other in a wireless communication system using a wireless local area network (WLAN).

According to an example embodiment, home gadgets 721, home appliances 722, entertainment devices 723, and an access point (AP) 710 may form an Internet of Things (IoT) network system that is one type of an embedded system. Each of the home gadgets 721, the home appliances 722, the entertainment devices 723, and the AP 710 may include a security IC (e.g., 100 of FIG. 1) according to an example embodiment, generate tokens based on bits of interest related to performance of the operation, and detect error bits generated during a process based on a comparison result between the tokens. A user experience in an embedded system environment may be improved by providing a process based on data integrity of the home gadgets 721, the home appliances 722, the entertainment devices 723, and the AP 710 forming the IoT network system, through tokens generated for each process in an electronic device. In this case, the home gadgets 721, the home appliances 722, and the entertainment devices 723 may wirelessly communicate with the AP 710, and the home gadgets 721, the home appliances 722, and the entertainment devices 723 may wirelessly communicate with each other.

The security IC 100 according to the disclosure may have a characteristic of enabling selective error detection for a multi-bit error without generating excessive overhead to the memory 14, by performing an error detection operation using tokens, which has been described above. Therefore, a security system suitable for an embedded system environment and guaranteeing data integrity through a security IC according to the disclosure may be provided.

Although the above description of the disclosure illustrates a detection of error based on an data stored before and after performance of an operation, the disclosure is not limited thereto. According to another example embodiment, a detection of error may be based on an data stored before and after an event. For example, according to another example embodiment, there is provided an apparatus including: a memory storing one or more instructions; and a processor configured to execute the one or more instructions to: obtain first data based on first bits of interest before a first event and second bits of interest before a second event, generate a first token by performing a conversion operation on the first data, obtain second data based on third bits of interest after the first event and fourth bits of interest after the second event, generate a second token by performing a conversion operation on the second data, and detect whether an error has occurred on at least one of the first bits of interest, the second bits of interest, the third bits of interest and the fourth bits of interest, based on the first token with the second token.

The processor may be further configured to compare the first token with the second token, and determine that no error has occurred on at least one of the first bits of interest, the second bits of interest, the third bits of interest and the fourth bits of interest, based on a difference value between the first token and the second token is zero as a result of the comparison.

The processor may be further configured to compare the first token with the second token, and determine that error has occurred on at least one of the first bits of interest, the second bits of interest, the third bits of interest and the fourth bits of interest, based on a difference value between the first token and the second token being not zero as a result of the comparison.

The processor may be further configured to identify a number of at least one error-occurred bit or a location of the at least one error-occurred bit based on the result of the comparison between the first token and the second token.

The processor may be further configured to increase an error counter value by 1 based on the determination that determine that the error has occurred, and transmit a signal including an operation stop command or a reset command to the processor based on the error counter value being greater than a reference value.

The processor may be further configured to generate the first token and the second token by performing one of a hash operation, a modular operation, a multiplication operation, an addition operation, a division operation, an XOR operation, and a data conversion operation according to a particular notation, on the first data and the second data, respectively.

While the disclosure has been particularly shown and described with reference to example embodiments thereof, it will be understood that various changes in form and details may be made therein without departing from the spirit and scope of the following claims.

What is claimed is:

1. A security integrated circuit (IC) comprising:
    a memory comprising a first register and a second register;
    a token generation circuit configured to:
        generate first data based on first bits of interest extracted before performance of an operation from the first register,
        generate a first token by converting the first data,
        generate second data based on second bits of interest extracted after the performance of the operation from the second register, and
        generate a second token by converting the second data; and
    an error detection circuit configured to detect an error on the first bits of interest or the second bits of interest by comparing the first token with the second token.

2. The security IC of claim 1, wherein the error detection circuit is further configured to determine that no error has occurred on the first bits of interest or the second bits of interest based on a difference value between the first token and the second token being zero as a result of the comparing.

3. The security IC of claim 1, wherein the error detection circuit is further configured to determine that an error has occurred on the first bits of interest or the second bits of interest based on a difference value between the first token and the second token being not zero as a result of the comparing.

4. The security IC of claim 1, wherein the error detection circuit is further configured to identify a number of at least one error-occurred bit or a location of the at least one error-occurred bit based on a result of the comparing between the first token and the second token.

5. The security IC of claim 1, wherein the error detection circuit is further configured to:
    increase an error counter value by 1 based on a difference value between the first token and the second token being not zero as a result of the comparing, and
    transmit a signal comprising an operation stop command or a reset command to a processor based on the error counter value being greater than a reference value.

6. The security IC of claim 1, wherein the token generation circuit is further configured to generate the first token and the second token by performing one of a hash operation, a modular operation, a multiplication operation, an addition operation, a division operation, an XOR operation, and a data conversion operation according to a particular notation, on the first data and the second data, respectively.

7. The security IC of claim 1, wherein the first bits of interest indicate bit values stored at first locations in a register before the performance of the operation, and the second bits of interest indicate bit values stored at the first locations of the first bits of interest in the register after the performance of the operation.

8. An operating method of a security integrated circuit (IC), the method comprising:
    generating first data based on first bits of interest extracted before performance of an operation;
    generating a first token by converting the first data;
    generating second data based on second bits of interest extracted after the performance of the operation;
    generating a second token by converting the second data; and
    detecting an error on the first bits of interest or the second bits of interest by comparing the first token with the second token.

9. The operating method of claim 8, wherein the detecting the error comprises determining that no error has occurred on the first bits of interest or the and second bits of interest based on a difference value between the first token and the second token being zero as a result of the comparing.

10. The operating method of claim 8, wherein the detecting the error comprises determining that an error has occurred on the first bits of interest or the second bits of interest based on a comparison difference value between the first token and the second token being not zero as a result of the comparing.

11. The operating method of claim 8, further comprising identifying a number of at least one error-occurred bit or a location of the at least one error-occurred bit based on a result of the comparing between the first token and the second token.

12. The operating method of claim 8, further comprising:
increasing an error counter value by 1 based on a difference value between the first token and the second token being not zero as a result of the comparing; and
transmitting a signal comprising an operation stop command or a reset command to a processor based on the error counter value being greater than a reference value.

13. The operating method of claim 8, wherein the generating the first token and the generating the second token comprise generating the first token and the second token by performing one of a hash operation, a modular operation, a multiplication operation, an addition operation, a division operation, and an XOR operation on the first data and the second data, respectively.

14. The operating method of claim 8, wherein the first bits of interest indicate bit values stored at first locations in a register before the performance of the operation, and the second bits of interest indicate bit values stored at the first locations of the first bits of interest in the register after the performance of the operation.

15. An electronic device comprising:
a memory comprising at least one register; and
a processor configured to:
generate first data based on first bits of interest extracted before performance of an operation by the electronic device,
generate a first token by converting the first data,
generate second data based on second bits of interest extracted after the performance of the operation by the electronic device,
generate a second token by converting the second data, and
identify a number of error-occurred bits or locations of the error-occurred bits based on a result of a comparison between the first token and the second token.

16. The electronic device of claim 15, wherein the processor is further configured to determine that no error has occurred on the first bits of interest or the second bits of interest based on a difference value between the first token and the second token is zero as a result of the comparing.

17. The electronic device of claim 15, wherein the processor is further configured to determine that an error has occurred on at least one bit among the first bits of interest or the second bits of interest based on a comparison difference value between the first token and the second token being not zero as a result of the comparing.

18. The electronic device of claim 15, wherein the processor is further configured to:
increase an error counter value by 1 based on a difference value between the first token and the second token being not zero as a result of the comparing, and
transmit a signal comprising an operation stop command or a reset command to the processor based on the error counter value is greater than a reference value.

19. The electronic device of claim 15, wherein the processor is further configured to generate the first token and the second token by performing one of a hash operation, a modular operation, a multiplication operation, an addition operation, a division operation, an XOR operation, and a data conversion operation according to a particular notation, on the first data and the second data, respectively.

20. The electronic device of claim 15, wherein the first bits of interest indicate bit values stored at particular locations in the at least one register before the performance of the operation, and the second bits of interest indicate bit values stored at the locations of the first bits of interest in the at least one register after the performance of the operation.

* * * * *